US010356212B2

(12) United States Patent
Doar et al.

(10) Patent No.: US 10,356,212 B2
(45) Date of Patent: Jul. 16, 2019

(54) APPLICATION DELIVERY TO A COMPUTING DEVICE USING DYNAMIC APPLICATION VOLUME CREATION AND STREAMING (71) Applicant: VMware, Inc., Palo Alto, CA (US)

(72) Inventors: Chen Doar, Herzliya (IL); Rami Stern, Herzliya (IL); Shadi Massalha, Herzliya (IL); Or Lupovitz, Herzliya (IL); Ehud Sicron, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 386 days.

(21) Appl. No.: 15/249,258

(22) Filed: Aug. 26, 2016

(65) Prior Publication Data

US 2018/0063284 A1   Mar. 1, 2018

(51) Int. Cl.
*G06F 15/16* (2006.01)
*H04L 29/08* (2006.01)
*G06F 3/06* (2006.01)

(52) U.S. Cl.
CPC ............ *H04L 67/34* (2013.01); *G06F 3/0605* (2013.01); *G06F 3/067* (2013.01); *G06F 3/0665* (2013.01); *H04L 67/06* (2013.01); *H04L 67/1097* (2013.01)

(58) Field of Classification Search
CPC ..... H04L 67/34; H04L 67/06; H04L 67/1097; H04L 67/42; H04L 67/1091; G06F 3/067; G06F 3/0665; G06F 3/0605
See application file for complete search history.

(56) References Cited

U.S. PATENT DOCUMENTS

| | | | | |
|---|---|---|---|---|
| 8,112,505 B1* | 2/2012 | Ben-Shaul | ........ | G06F 17/30168 709/217 |
| 8,983,910 B1* | 3/2015 | Panchauli | ......... | G06F 17/30073 707/640 |
| 9,092,291 B1* | 7/2015 | Adib | .......................... | G06F 8/61 |
| 9,239,680 B2* | 1/2016 | Eguchi | ................... | G06F 3/0605 |
| 9,274,974 B1* | 3/2016 | Chen | ...................... | G06F 12/109 |
| 2008/0195797 A1* | 8/2008 | Sherman | ................ | G06F 3/0605 711/103 |
| 2015/0227357 A1* | 8/2015 | Zamir | ........................ | G06F 8/65 717/173 |
| 2015/0227384 A1* | 8/2015 | Zamir | ........................ | G06F 8/65 718/1 |
| 2015/0227567 A1* | 8/2015 | Zamir | ..................... | H04L 67/10 709/223 |

* cited by examiner

*Primary Examiner* — Benjamin M Thieu (57) ABSTRACT

Techniques are described for delivering an application to a computing device by dynamically creating an application storage volume, such as a virtual disk, based on a minimal subset of application files downloaded from a remote server and attaching the virtual disk to the computing device in order to make the application executable from the virtual disk. The minimal subset of files access to at least some portion of the functionality of the application. Dynamically creating the virtual disk can be completed quickly and the minimal subset of application files is smaller than the full size of the application, which improves the speed of application delivery to the device. After the virtual disk is attached, the user can begin working on the application, while the remaining files are streamed to the virtual disk both as an ongoing background process and in response to on-demand requests, transparently from the user's perspective.

20 Claims, 5 Drawing Sheets

APPLICATION DELIVERY TO A COMPUTING DEVICE USING DYNAMIC APPLICATION VOLUME CREATION AND STREAMING

TECHNICAL FIELD

The present disclosure generally relates to application delivery to computing devices and more particularly relates to delivering an application to a computing device by dynamically creating an application volume and streaming content to the volume.

BACKGROUND

Information Technology (IT) management has become an increasingly complex task for a large organization. There may be thousands of users (e.g. employees) carrying their own individual endpoint devices (e.g. laptops, workstations, smart phones, tablet computers, etc.) and each device may have an abundance of software and applications that are operating on the device. Some of these applications are unique to each individual user, while others are identical across several devices or at least share some of the same components (e.g. files, registry entries, data). Users generally want the freedom to install whatever software and applications they choose while IT departments are faced with the need to maintain compliance and data protection across this complex ecosystem. For example, a typical IT department today needs to be able to manage, secure and deliver applications to users, distribute software updates, as well as be able to back up and restore any user's data and settings on demand. One particular requirement for managing applications on such a large scale is enabling an IT administrator to remotely add or remove applications on an individual computing device from a central location and to do so across numerous devices.

There exist a number of software solutions that attempt to aid organizations in creating application packages. For example, the System Center Configuration Manager (SCCM) available from Microsoft Corporation; the LANDESK Management Suite (LDMS) available from LANDESK Software; and the Client Management Suite (CMS) available from Symantec Corporation; all take different approaches in assisting an IT administrator in application management, including in some cases providing an application package that could be delivered to end user devices. However, these existing systems suffer from various drawbacks that limit their usability.

One of the drawbacks of such systems is that at the user's end, the time delay between the application assignment by the administrator and the time when the user can start using the application can be quite significant. Many applications are large (e.g. Microsoft Office) and downloading all of the files of an application can take a long time. Often, the application is being downloaded over a wide area network (WAN) connection, which further exacerbates the delay. All of this usually results in the user waiting a significant amount of time for the application to be delivered to their device, causing inefficiencies and loss of productivity.

Another source of inefficiency stems from the tight coupling between the operating system (OS) and the applications installed on the endpoint computing device. With conventional application installations, the files and registry entries that are needed by the application are added to various locations, without any clear delineation of which components comprise which application. Thereafter, to remove an application, an uninstall process needs to be followed to ensure that all of the previously added components are removed from all the various locations. This makes adding and removing applications on a computing device difficult in some cases, especially when doing so remotely, without user input. In light of these shortcomings, a more efficient and robust system is needed for managing applications on user endpoint devices.

DETAILED DESCRIPTION

Systems and methods in accordance with various embodiments of the present disclosure overcome at least some of the above mentioned shortcomings and deficiencies by dynamically creating an application storage volume, such as a virtual disk, based on a minimal subset of application files downloaded from a remote server and attaching the virtual disk to the computing device in order to make the application executable from the virtual disk. The minimal set is the subset of all application files that will enable the user to use at least some portion of the functionality the application offers without having any of the remaining files installed. Dynamically creating the virtual disk in the manner described herein takes just seconds and the minimal subset of application files is usually much smaller than the full size of the application with all of its files. After the virtual disk is created and attached, the user can begin working on the application, while the remaining files are streamed to the virtual disk both as an ongoing background process and in response to on-demand requests, transparently from the perspective of the user.

In various embodiments, a computing device to which the application will be delivered includes an application storage volume agent, a driver and a transport client. When an administrator assigns an application to be delivered to the computing device, the request is issued and received by the transport client on the device. The transport client is configured to download, from a remote file server, a minimal subset of all application files. The minimal subset is smaller than the full set of application files and enables a portion of functionality of the application to be accessed even without the presence of the remaining application files on the device. Once the minimal subset is downloaded, an application storage volume, such as a virtual disk, is dynamically generated and mounted on the computing device. The virtual disk contains the minimal subset of files, as well as placeholders for the remaining files necessary for a full application installation. For example, in addition to the minimal subset of application files, the virtual disk may contain stub files for each of the remaining files which have not been downloaded yet from the remote server. The stub file is a file that is empty of content and contains the metadata indicating that the file is there. The stub file is marked with an "offline" attribute, indicating that the content of the stub file can be downloaded from a server over the network.

Once the virtual disk is dynamically generated and mounted, the user may begin using the application, while a background process is started to download the remaining files to the device (e.g. by adding the remaining files in a download queue to be downloaded sequentially). While not all of the features of the application may be available at this time, the user can begin using certain portions of the functionality of the application. If the user invokes an operation that uses one of the remaining files that have not yet finished downloading, the driver may suspend the operation and request that the transport client download the content of the requested file. The transport client then interrupts all other downloads (stops downloading the other files in the queue) and immediately begins downloading the requested file. Once the file has been downloaded, the filter driver may release the file and resume the operation so that the user can continue using the application. The downloading of the remaining files in the queue can also be resumed. Over time, all of the remaining files of the application will eventually be downloaded to the device, enabling the full functionality of the application.

In various embodiments, the application storage volume is an attachable and detachable container that holds the files of the application and enables the application to be executed directly from the container. In various embodiments, the application storage volume may be a virtual disk, such as a disk of the Virtual Hard Disk (VHD) or Virtual Machine Disk (VMDK) format. To attach the application storage volume, the virtual disk containing the application components may be mounted on the device and the application storage volume agent can modify the registry entries on the operating system to make the application executable directly from the virtual disk. The mounting of the virtual disk enables the application to be executed without going through the conventional application installation process since all of the components necessary for the application are either contained in the virtual disk or are represented as being contained by using stub files. In some cases, a single application storage volume can contain several applications, while in other cases, there is a separate application storage volume for each individual application.

In various embodiments, the application storage volume is described by a manifest that is stored on the server. The manifest contains a set of nodes, where each node describes a file in the virtual disk. The manifest nodes store data about each file, its path in the virtual disk, its signature (e.g. hash) and also contain data about the download stage of the file to enable streaming, meaning whether it forms part of the minimal set or not. The manifest of the application storage volume can be initially downloaded by the transport client and used to determine which files comprise the minimal subset of the application storage volume and should be downloaded from the server first.

Figure 1:
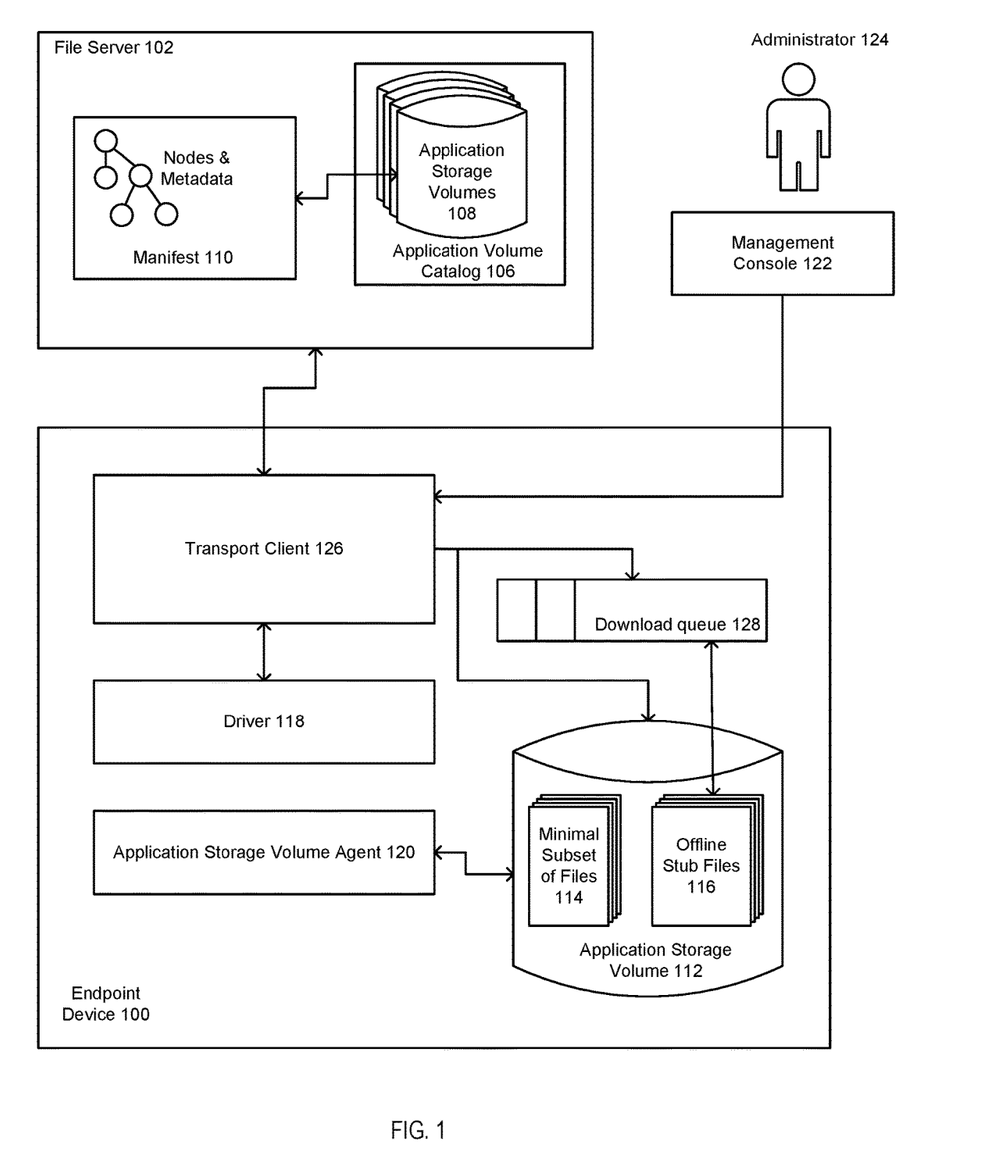
FIG. 1 illustrates an example of a system for delivering an application using application storage volumes and streaming, in accordance with various embodiments.

FIG. 1 illustrates an example of a system for delivering an application using application storage volumes and streaming, in accordance with various embodiments. The process of delivering an application may begin when the administrator 124 assigns an application to an endpoint device 100. The administrator 124 may utilize a management console 122 to assign applications to various endpoint devices, including endpoint device 100. There may be a number of applications available for assignment and the file server 102 may contain an application volume catalog 106, listing all of these available applications. The application volume catalog 106 can have a table listing all available application storage volumes by their unique ID. The application volume catalog may also have an Application Programming Interface (API) to provide the manifest 110 based on the ID of the application storage volume. The file server 102 can be hosted in a data center on premise or hosted in the cloud and the file server 102 contains all of the files and content necessary to create application storage volumes 108 for each application in the catalog. In order to receive assignments of applications, the transport client 126 on the endpoint device 100 exposes an external application programming interface (API) that can be accessed by the management console 122 in order to assign an application. This can be performed by a push or pull process and may require access to the catalog of application storage volumes 106.

When an application is assigned by the administrator 124, the transport client 126 operating on the endpoint device receives the request (e.g. via its API) to add the application. The transport client 126 then communicates with the file server 102 in order to obtain a manifest 110 of the assigned application. In one embodiment, the transport client 126 accesses the API of the application volume catalog 106 on the file server 102 to request and download the manifest 110. As previously mentioned, the manifest 110 describes all of the files necessary for a full installation of the application. The manifest 110 also contains metadata indicating which file comprises the minimal subset of files 114 necessary to be loaded to the endpoint device 100 before allowing the user to access the application. Based on the data in the manifest 110, the transport client 126 begins downloading the minimal subset of files 114 and generates the application storage volume 112. For example, the transport client 126 may create a virtual hard disk (VHD) that will contain all of the application files. Once the minimal subset 114 has completed downloading, the transport client 126 mounts the virtual disk on the endpoint device to make the application available to the user. At this time, the virtual disk contains the minimal subset of files 114 and a set of stub files 116 corresponding to the remaining files which have not been downloaded yet from the server, where each of the stub files is marked with an "offline" attribute. After the virtual disk is mounted, the transport client 126 starts a background process to sequentially download the content of all of the stub files from the server. This process is done by placing all of the stub files in a queue 128 and sequentially downloading the content of each file. Once the file is finished downloading, the transport client 126 removes the "offline" mark from the file to indicate that the content of the file is available directly from the virtual disk without requiring the download of the file from the server.

The application storage volume agent 120 is a program installed or otherwise deployed on the endpoint computing device 100. The agent 120 is configured to detect when an application storage volume 112 (virtual disk) has been mounted and merge the virtual disk on the endpoint device 100 to make the application inside the virtual disk executable and available to the user. In one embodiment, assigning the application does not require communication between the transport client 126 and the application storage volume agent 120, instead the application storage volume agent 120 automatically responds to virtual disk attachments on the endpoint device 100. The application storage volume agent 120 runs as a service and utilizes a filter driver to handle application calls and file system redirects to the application storage volume 112. By redirecting calls this way, the agent 120 enables the application to be executed directly from the virtual disk.

The application storage volume agent 120 works together with the driver 118 and the transport client 126 to enable on-demand access to the stub files 116 that have been marked with the "offline" attribute whose content has not yet been delivered to the endpoint device 100. When a user tries to access the portion of the application functionality that is not yet available because the required files necessary for that functionality have not been downloaded, the driver 118 intercepts the request and suspends the user operation. The driver 118 then requests the file from the transport client 126. The transport client 126 interrupts the downloading of the other files in the queue 128 and immediately begins downloading the requested file from the server 102. Once the file has finished downloading, the transport client 126 returns a response to the driver 118 and the driver 118 releases the file and resumes the user operation. From the user's perspective, it may appear that there was a slight delay in executing the requested operation, however depending on the size of the requested file, latency in the network connection and other factors, this delay may be well tolerable.

In various embodiments, a separate application storage volume 108 is created and uploaded to the server for each individual application available in the catalog 106 prior to assigning the applications. In order to make the application storage volume available in the catalog, it is first captured and a manifest generated to describe the volume. Capturing the application storage volume can be performed in a number of ways. One way to capture the application storage volume may be done by capturing the changes that are made on a reference virtual machine or physical device during installation of the application. The changes can be obtained by recording the state of the system prior to installing the application (capturing a pre-installation snapshot), then recording the state of the system after the application has been installed (capturing a post-installation snapshot) and then comparing the two in order to determine the delta between the snapshots. The delta contains the files and registry entries that were modified during the application installation and this delta can be stored as a virtual disk (i.e. application storage volume). In another embodiment, capturing the application storage volume can be performed by statically analyzing the system on a computing device that has the application running thereon. For example, the static analysis may performed by inspecting the installation database to identify the basic application files, parsing the binary executable files to detect any file paths that reference additional necessary application components, scanning the component object model (COM) database on the endpoint device to search for related COM records, scanning the shell extensions in the registry and looking at other places in the operating system to identify all of the necessary application files for a full installation. All of these files can be collected and placed in a separate virtual disk which will be the application storage volume that can be added to the catalog. After the application storage volume has been created, a manifest is generated for the application storage volume. The manifest 110 will also be made available for download from the server 102, along with its respective application storage volume. In one embodiment, the manifest 110 is comprised of a set of nodes, where each node describes a file in the virtual disk. The manifest nodes store data about each file, its path in the virtual disk, its signature (e.g. MD5 checksum) and data about the download stage of the file to enable streaming.

Once the application storage volumes 108 have been generated, they can be uploaded to the server 102 to be made available for assignment to various endpoint devices. The uploading can be optimized by compressing the files before uploading the content of the files. In one embodiment, the upload process is deduplicated so that copies of the blocks or files that are already available on the server do not need to be re-uploaded.

In various embodiments, the minimal subset of files 114 of the application storage volume 112 contains the basic necessary files to enable some portion of functionality of the application without having the remaining files available on the endpoint device 100. As a simple example of this, not all of the font files under "C:\Windows\Fonts" are required to start using Microsoft Office. Thus, the minimal subset 114 might include the font files of several of the most popular fonts (e.g. Times New Roman, Arial, etc.) but not include the files for the less common fonts.

The minimal set 114 can be constructed by recording a list of file requests observed during the initial execution of the application. When an application is launched, a typical flow of requests is started, which may be the shortcut being accessed which points to the binary executable file, where the binary executable file in turn issues requests to access several dynamically linked libraries (DLLs) and so on. For example, when accessing the Microsoft Word application, the desktop shortcut might be accessed first, which points to the file "winword.exe", which in turn loads "MSO.dll" and "OART.dll" and so on. In order to identify which files should be included in the minimal subset 114, the application may be executed on a reference machine (e.g. a virtual machine or physical device) for a predetermined period of time while recording the sequence of file access requests. Typically, after some period of time (depending on the application) after the application loads, it stops requesting files form the file system even though not all files have been requested yet. Some complex applications do not necessarily load all of the files at first load, but they still typically check that the files exist (either for security or simple validation). For this reason, when constructing the application storage volume 112, rather than merely including the minimal subset, a set of stub files 116 (files empty of content but having the metadata indicating that the file is there) are created for the remaining files that have not been downloaded yet to the endpoint device 100. As a result of including these stub files 116, the validation check by the application is successful and the application is able to load and execute.

In some alternative embodiments, the minimal subset 114 and the stubs 116 may be created on a block level instead of file level, meaning that a minimal subset of blocks is downloaded and a set of stub blocks are created and streamed for the remaining blocks of the application.

As mentioned above, in order to create a virtual disk that allows the user to start working with the application, the virtual disk may need to contain the minimal subset 114 of the application along with the metadata of the files needed by the application storage volumes agent 120 in order to identify the virtual disk as a legitimate application storage volume 112. In one embodiment, all of the minimal subset of files and the metadata are acquired before mounting the virtual disk. To enable streaming of the application, all of the remaining files are created as a stub file or garbage file marked with an "offline" attribute so that the driver 118 can raise an on-demand request when some external process tries to access the file.

As previously described, the application can be enabled on the endpoint device 100 by dynamically attaching the application storage volume 112 to the computing device 100. In one embodiment, the application storage volume 112 can be attached by mounting the virtual hard disk containing the application to the computing system and modifying the registry keys, file paths and other information to make the application appear as though it has been locally installed. Alternatively, the act of attaching the application storage volume 112 may involve mapping or otherwise making available the application volume to the computing system. For example, the volume containing the application may be mapped and registry settings changed to direct future calls of that file type to the application stored in the virtual hard disk. An application storage volume 112 may include the files representative of the application. Rather than having to go through the traditional installation process to deploy the application on the endpoint device 100, the application storage volume 112 can be attached by mounting the virtual disk. Mounting an application storage volume may be accomplished by associating the name of the volume with an access path to the volume. Once mounted, the application files, directories, and other application elements may be overlaid within the file system of the endpoint device in order to provide the user with access to the application.

In some embodiments, the application storage volume can subsequently be detached from the endpoint computing device 100, thereby disabling the application on the computing device 100. The process of detaching the application volume 112 may include un-mounting the virtual disk from the computing device, or preventing the computing device from accessing the virtual disk and the corresponding components.

In some embodiments, a peer-to-peer (P2P) download mechanism can be utilized by the transport client 126 when downloading the content of the various files. In deployments where the file server 102 is located in a remote location (e.g. cloud hosted) and the connection to it is over a WAN, transport clients of different endpoint devices may collaborate to improve the speed of downloading the files from the file server. In these embodiments, when the transport client needs to download a file, it can first check whether any other endpoint device in the same LAN has previously downloaded this file from the file server 102. If there is another endpoint device on the same LAN that has downloaded the file, the transport client 126 can retrieve the file from that device. The transport client 126 can utilize a transport peer service to discover which devices have downloaded the files. For example, the Torrent protocol might be used for the peer-to-peer file transfers.

In various embodiments, to further improve performance files can be stored in a compressed format on the file server 102. The transport client 126 can download files from the file server using HyperText Transfer Protocol (HTTP) requests. To increase the speed of downloading the files in cloud based deployments, Content Delivery Network (CDN) services can be utilized. Furthermore, in some embodiments, downloading many small files may create a lot of overhead opening and closing connections and making HTTP requests. To further reduce this overhead, bundles of small files can be created and downloaded as a single larger file. When utilizing P2P transfers and Torrent protocol, it may be advantageous to pre-calculate the file pieces needed by the Torrent protocol and store them in the manifest 110. Another optimization that can be performed on the system is file deduplication, where duplicated files in the application storage volume is downloaded only once to the endpoint device. Also, files that are already present on the endpoint device 100 can simply be used instead of downloading them from the file server.

Figure 2:
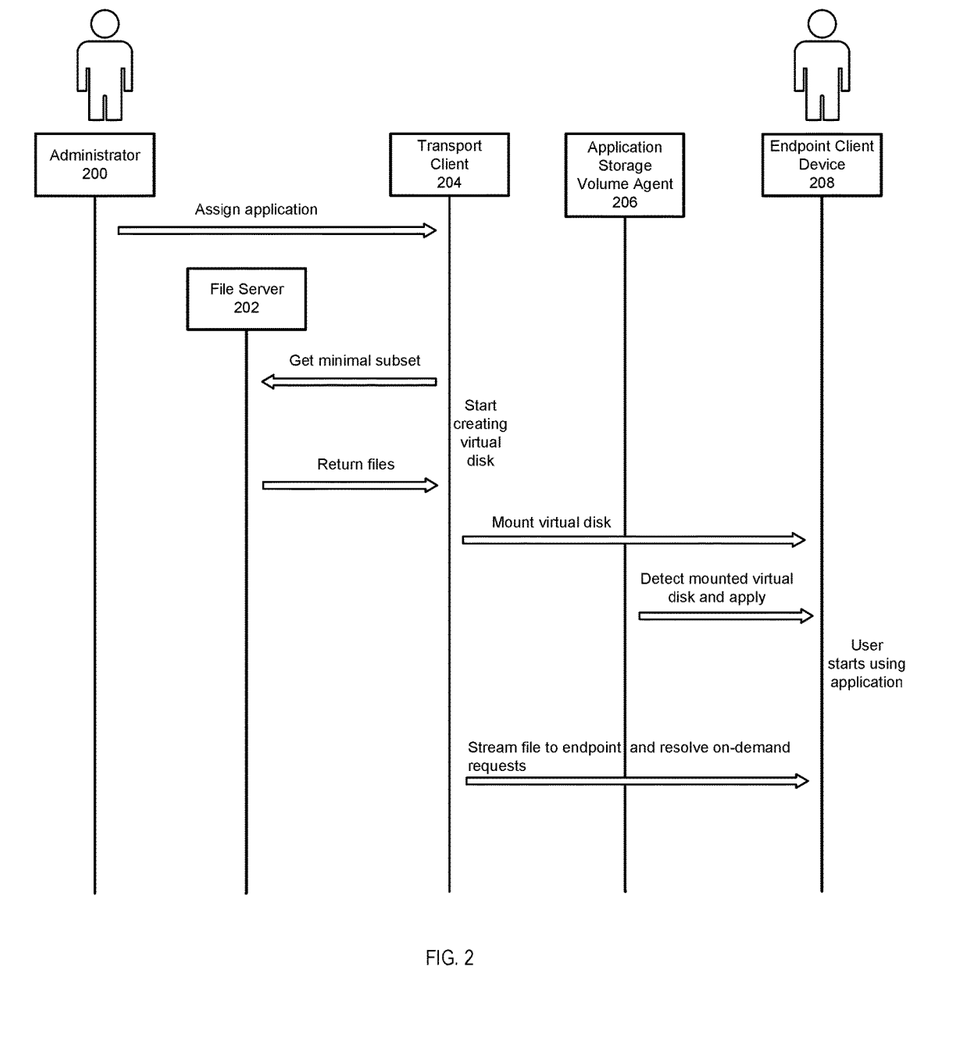
FIG. 2 illustrates an example of a request sequence diagram for assigning an application to an endpoint device, in accordance with various embodiments.

FIG. 2 illustrates an example of a request sequence diagram for assigning an application to an endpoint device, in accordance with various embodiments. As illustrated in this figure, the administrator 200 first assigns the application to an endpoint device by causing a request to be provided to the transport client 204. The request can be initiated by the administrator 200 using a management console which can relay the request to the transport client via accessing an API or in another way.

Once the transport client 204 receives the request, it begins downloading the minimal subset of files for the application from the file server 202 and creating the virtual disk for the application. In one embodiment, the transport client 204 can first retrieve a manifest from the file server, which identifies which files will need to be downloaded from the server by the transport client to create the minimal subset. The transport client can then download the necessary files and populate the virtual disk with the files, as well as with the stub files for the remaining files which do not form part of the minimal subset. Once all of the files in the minimal subset have been downloaded, the transport client 204 can mount the virtual disk (including the minimal subset) on the endpoint computing device 208 to make the application executable and ready for use by the user.

Once the virtual disk containing the application has been mounted on the endpoint device 208, the application storage volume agent 206 can detect the newly mounted virtual disk and apply it as a new application on the device. As previously mentioned, the agent 206 can apply the virtual disk by modifying the registry keys, file paths and other information to make the application executable, appearing as though it has been locally installed. Once the virtual disk has been mounted, the transport client can start the process of streaming the file to the endpoint device and resolve any on-demand requests, as illustrated and discussed in further detail in FIG. 3.

Figure 3:
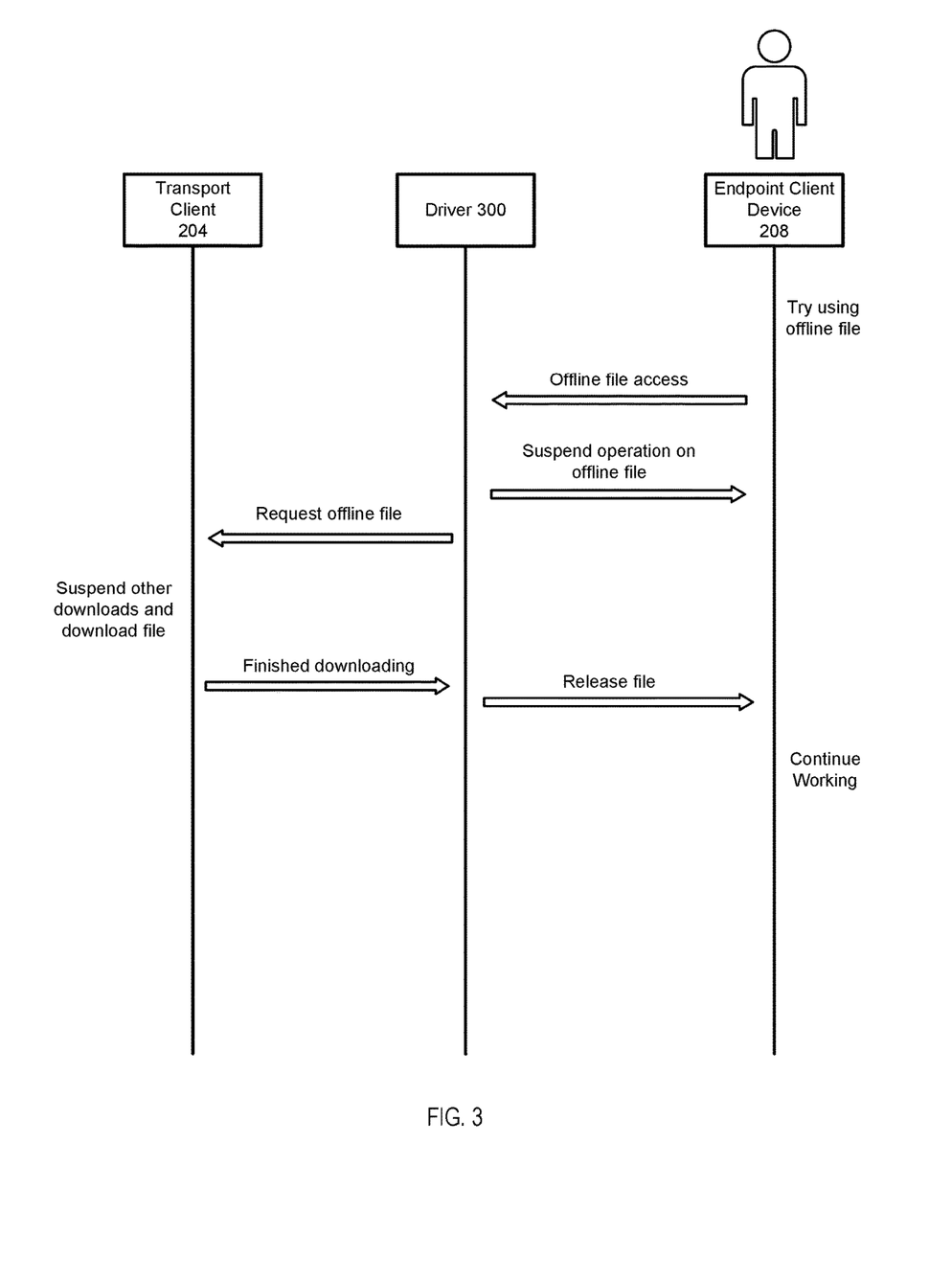
FIG. 3 illustrates an example of a request sequence diagram for resolving on-demand requests to download a file to an application storage volume, in accordance with various embodiments.

FIG. 3 illustrates an example of a request sequence diagram for resolving on-demand requests to download a file to an application storage volume, in accordance with various embodiments. As shown in the illustration, once the virtual disk has been mounted on the endpoint device 208, the user may begin using the application. At some point, the user may try to use a feature of the application that requires one of the stub files or "offline" files in the virtual disk. When a request to access such a file is received, the driver 300 intercepts the request and suspends the operation on the offline file. The driver 300 then requests the transport client 204 to download the file from the server. The transport client 204 then suspends all other downloads that are in the process of being downloaded and downloads the requested file from the server. Once the transport client 204 has finished downloading the requested file, it can notify the driver 300. The driver may then release the file to be used by the application and remove the "offline" marking from the file. The user can continue using the application, including the functionality enabled by the newly downloaded file. The transport client 204 may also resume the downloading of other files in the queue in order.

Figure 4:
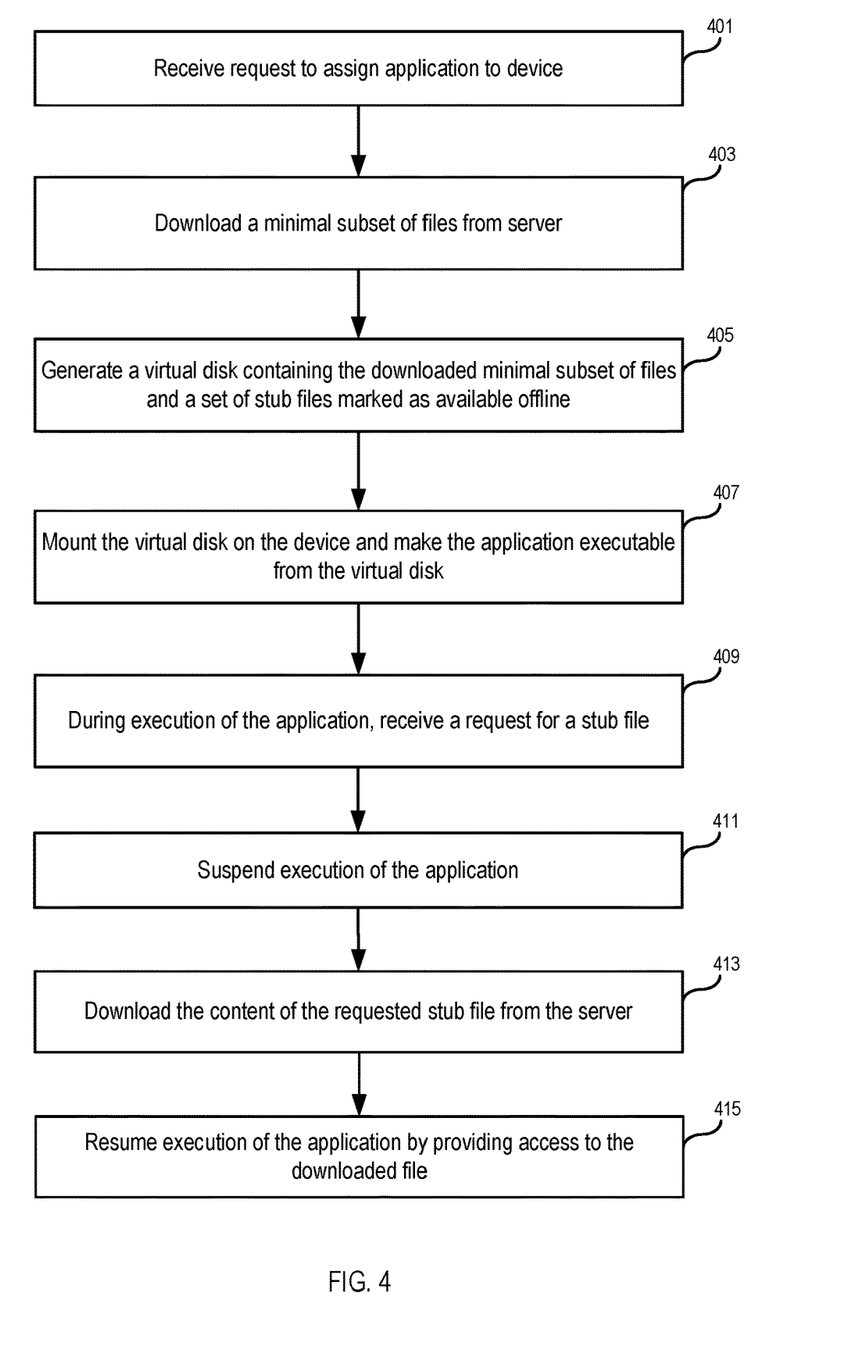
FIG. 4 illustrates an example of a process for delivering an application to a computing device using dynamic application storage volumes and streaming, in accordance with various embodiments.

FIG. 4 illustrates an example of a process for delivering an application to a computing device using dynamic application storage volumes and streaming, in accordance with various embodiments. As illustrated in operation 401, a request to assign the application to a device is received. The request may be initiated by an administrator that wishes to deploy the application remotely to a user's endpoint computing device. For example, an IT administrator may wish to deploy the Microsoft Office application on an employee's laptop in the organization.

In operation 403, a minimal subset of files of the application is downloaded from the server. In one embodiment, the minimal subset is the subset of files that is required to enable some form of functionality of the application for the user (not its full functionality). The minimal subset may be downloaded by a transport client operating on the endpoint computing device. In operation 405, a virtual disk (e.g. VHD or VMDK) is generated on the endpoint device, which contains the minimal subset of files, as well as a set of stub files corresponding to the remaining files which have not yet been downloaded from the server. The stub files may be marked as available "offline". In operation 407, once the minimal subset has finished downloading, the virtual disk is mounted on the endpoint computing device. In one embodiment, the virtual disk is mounted by the transport client after the minimal subset has completed downloading. The application storage volume agent can detect the mounting of the virtual disk and make the application executable directly form the virtual disk. The transport client may then begin the process of downloading the content of the stub files which have been marked as available "offline". The process of downloading these files may be performed in the background, transparently from the perspective of the user.

In operation 409, during execution of the application, the system may issue a request for a stub file in the virtual disk which has been marked as available "offline". In operation 411, the request can be intercepted and the execution of the application may be suspended. In operation 413, the transport client can download the content of the requested stub file from the server and in operation 415, the application can be resumed by providing access to the downloaded file.

Figure 5:
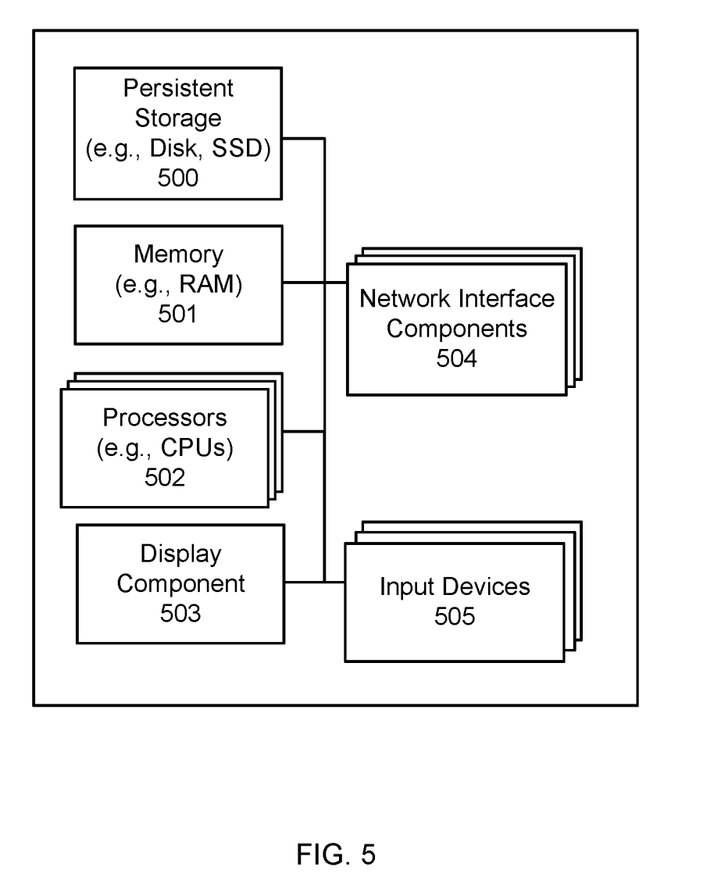
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for delivering an application to a computing device, the method comprising:
   receiving a request to assign the application to the computing device;
   downloading, from a remote server, a minimal subset of files from a set of all application files of the application, wherein the minimal subset enables a portion of functionality of the application without remaining files in the set of all application files;
   generating a virtual disk containing the downloaded minimal subset of files and a set of stub files corresponding to the remaining files, wherein the set of stub files are empty of content and are marked with an offline attribute to indicate that the content of the stub file is available for download from the server;
   mounting the virtual disk on the computing device to make the application executable from the virtual disk;
   during execution of the application, receiving a request for a stub file marked with the offline attribute;
   suspending the execution of the application;
   downloading the content of the requested stub file from the remote server; and
   resuming the execution of the application by providing access to the downloaded content of the stub file in response to the request.

2. The method of claim 1, further comprising:
   after the virtual disk is generated, initiating a background process to begin downloading the content of the remaining files in a sequential queue from the remote server.

3. The method of claim 2, further comprising:
   in response to receiving the request for the stub file during the execution of the application, suspending the background process of downloading the remaining files in the queue;
   moving the requested stub file to a beginning place in the queue to begin downloading the content of the requested stub file; and
   in response to completing the download of the content of the stub file, releasing the file for access and resuming the background process of downloading the remaining files in the queue.

4. The method of claim 1, wherein the remote server stores a manifest that describes the set of all application files in the virtual disk, the manifest comprising a node for each of the application files, each node containing a file path, a signature and data indicating whether the file corresponding to the node is part of the minimal subset; and
   wherein the manifest is downloaded by the computing device from the remote server prior to downloading the minimal subset.

5. The method of claim 1, wherein the minimal subset is identified by executing the application on a different computing device for a period of time and recording a list of files that were accessed by the application during execution.

6. The method of claim 1, wherein downloading the minimal subset further comprises:
   determining that a peer computing device residing on the same local area network (LAN) as the computing device has previously downloaded the application from the remote server over a wide area network (WAN) connection; and
   downloading the minimal subset from the peer computing device over the LAN.

7. The method of claim 1, wherein the computing device includes a transport client configured to download the minimal subset and the remaining files, wherein the transport client further includes an application programming interface (API) configured to receive requests to assign the application to the computing device from a remote location over a network connection.

8. A computing device, comprising:
   at least one processor; and
   memory including instructions that, when executed by the at least one processor, cause the computing device to:
      receive a request to assign the application to the computing device;
      download, from a remote server, a minimal subset of files from a set of all application files of the application, wherein the minimal subset enables a portion of functionality of the application without remaining files in the set of all application files;
      generate a virtual disk containing the downloaded minimal subset of files and a set of stub files corresponding to the remaining files, wherein the set of stub files are empty of content and are marked with an offline attribute to indicate that the content of the stub file is available for download from the server;
      mount the virtual disk on the computing device to make the application executable from the virtual disk;
      during execution of the application, receive a request for a stub file marked with the offline attribute;
      suspend the execution of the application;
      download the content of the requested stub file from the remote server; and
      resume the execution of the application by providing access to the downloaded content of the stub file in response to the request.

9. The computing device of claim 8, the memory further including instructions that, when executed by the at least one processor, cause the computing device to:
   after the virtual disk is generated, initiate a background process to begin downloading the content of the remaining files in a sequential queue from the remote server.

10. The computing device of claim 9, the memory further including instructions that, when executed by the at least one processor, cause the computing device to:
in response to receiving the request for the stub file during the execution of the application, suspend the background process of downloading the remaining files in the queue;
move the requested stub file to a beginning place in the queue to begin downloading the content of the requested stub file; and
in response to completing the download of the content of the stub file, release the file for access and resuming the background process of downloading the remaining files in the queue.

11. The computing device of claim 8, wherein the remote server stores a manifest that describes the set of all application files in the virtual disk, the manifest comprising a node for each of the application files, each node containing a file path, a signature and data indicating whether the file corresponding to the node is part of the minimal subset; and
wherein the manifest is downloaded by the computing device from the remote server prior to downloading the minimal subset.

12. The computing device of claim 8, wherein the minimal subset is identified by executing the application on a different computing device for a period of time and recording a list of files that were accessed by the application during execution.

13. The computing device of claim 8, wherein downloading the minimal subset further comprises:
determining that a peer computing device residing on the same local area network (LAN) as the computing device has previously downloaded the application from the remote server over a wide area network (WAN) connection; and
downloading the minimal subset from the peer computing device over the LAN.

14. The computing device of claim 8, wherein the computing device includes a transport client configured to download the minimal subset and the remaining files, wherein the transport client further includes an application programming interface (API) configured to receive requests to assign the application to the computing device from a remote location over a network connection.

15. A non-transitory computer readable storage medium comprising one or more sequences of instructions, the instructions when executed by one or more processors causing the one or more processors to execute the operations of:
receiving a request to assign the application to the computing device;
downloading, from a remote server, a minimal subset of files from a set of all application files of the application, wherein the minimal subset enables a portion of functionality of the application without remaining files in the set of all application files;
generating a virtual disk containing the downloaded minimal subset of files and a set of stub files corresponding to the remaining files, wherein the set of stub files are empty of content and are marked with an offline attribute to indicate that the content of the stub file is available for download from the server;
mounting the virtual disk on the computing device to make the application executable from the virtual disk;
during execution of the application, receiving a request for a stub file marked with the offline attribute;
suspending the execution of the application;
downloading the content of the requested stub file from the remote server; and
resuming the execution of the application by providing access to the downloaded content of the stub file in response to the request.

16. The non-transitory computer readable storage medium of claim 15, further comprising instructions that when executed by one or more processors causing the one or more processors to execute the operations of:
after the virtual disk is generated, initiating a background process to begin downloading the content of the remaining files in a sequential queue from the remote server.

17. The non-transitory computer readable storage medium of claim 16, further comprising instructions that when executed by one or more processors causing the one or more processors to execute the operations of:
in response to receiving the request for the stub file during the execution of the application, suspending the background process of downloading the remaining files in the queue;
moving the requested stub file to a beginning place in the queue to begin downloading the content of the requested stub file; and
in response to completing the download of the content of the stub file, releasing the file for access and resuming the background process of downloading the remaining files in the queue.

18. The non-transitory computer readable storage medium of claim 15, wherein the remote server stores a manifest that describes the set of all application files in the virtual disk, the manifest comprising a node for each of the application files, each node containing a file path, a signature and data indicating whether the file corresponding to the node is part of the minimal subset; and
wherein the manifest is downloaded by the computing device from the remote server prior to downloading the minimal subset.

19. The non-transitory computer readable storage medium of claim 15, wherein the minimal subset is identified by executing the application on a different computing device for a period of time and recording a list of files that were accessed by the application during execution.

20. The non-transitory computer readable storage medium of claim 15, wherein downloading the minimal subset further comprises:
determining that a peer computing device residing on the same local area network (LAN) as the computing device has previously downloaded the application from the remote server over a wide area network (WAN) connection; and
downloading the minimal subset from the peer computing device over the LAN.

* * * * *